(12) United States Patent
Shi et al.

(10) Patent No.: US 10,876,838 B2
(45) Date of Patent: Dec. 29, 2020

(54) SILICON-BASED MICRO-MACHINED VIBRATORY GYROSCOPE WITH AN I-SHAPED STRUCTURE

(71) Applicant: NANJING UNIVERSITY OF SCIENCE AND TECHNOLOGY, Jiangsu (CN)

(72) Inventors: Qin Shi, Nanjing (CN); Anping Qiu, Nanjing (CN); Guoming Xia, Nanjing (CN); Yang Zhao, Nanjing (CN)

(73) Assignee: NANJING UNIVERSITY OF SCIENCE AND TECHNOLOGY, Jiangsu (CN)

( * ) Notice: Subject to any disclaimer, the term of this patent is extended or adjusted under 35 U.S.C. 154(b) by 197 days.

(21) Appl. No.: 16/066,634

(22) PCT Filed: Sep. 26, 2016

(86) PCT No.: PCT/CN2016/100081
§ 371 (c)(1),
(2) Date: Jun. 27, 2018

(87) PCT Pub. No.: WO2017/113911
PCT Pub. Date: Jul. 6, 2017

(65) Prior Publication Data
US 2019/0017822 A1  Jan. 17, 2019

(30) Foreign Application Priority Data
Dec. 28, 2015 (CN) .......................... 2015 1 1004405

(51) Int. Cl.
*G01C 19/5621* (2012.01)
*G01C 19/5747* (2012.01)

(52) U.S. Cl.
CPC ..... *G01C 19/5621* (2013.01); *G01C 19/5747* (2013.01)

(58) Field of Classification Search
CPC ........... G01C 19/5621; G01C 19/5747; G01C 19/5607; G01C 19/5414; G01C 19/5628;
(Continued)

(56) References Cited

U.S. PATENT DOCUMENTS

2008/0229824 A1  9/2008  Higuchi et al.
2015/0316378 A1  11/2015  Kergueris et al.

FOREIGN PATENT DOCUMENTS

CN   101135559 A   3/2008
CN   102252668 A   11/2011
(Continued)

*Primary Examiner* — Stephen D Meier
*Assistant Examiner* — Nigel H Plumb
(74) *Attorney, Agent, or Firm* — Birch, Stewart, Kolasch & Birch, LLP

(57) ABSTRACT

The invention relates to a silicon-based micro-machined vibratory gyroscope with an I-shaped structure, which is a measuring instrument used for measuring the angular rate perpendicular to a base, and comprises a top monocrystalline silicon, a middle monocrystalline silicon, and a bottom monocrystalline silicon; the top monocrystalline silicon being arranged with signal input and output lines is the silicon micro gyroscope packaged cover plate; the middle monocrystalline silicon is where the gyroscope mechanical structures are fabricated; the bottom monocrystalline silicon is a gyroscope substrate with fixed pedestals; the middle monocrystalline silicon layer is sealed in a closed cavity formed by top and bottom monocrystalline silicon layers. The invented gyroscope has properties of small error, high mechanical sensitivity, low vibration sensitivity, and low temperature sensitivity, and can implement motion decoupling of a driving mode and a detection mode, large amplitude vibration, and detection output decoupling.

8 Claims, 4 Drawing Sheets

(58) Field of Classification Search
CPC .. G01C 19/56; G01C 19/567; G01C 19/5705;
G01C 19/5712; G01C 19/5719; G01C
19/5726; G01C 19/5733; G01C 19/574;
G01C 19/5755; G01C 19/5762; G01C
19/5769; G01C 19/5776; G01C 19/5783;
G01C 19/5635; G01C 19/5642; G01C
19/5649; G01C 19/5656; G01C 19/5663;
G01P 1/00
See application file for complete search history.

(56) References Cited

FOREIGN PATENT DOCUMENTS

| | | |
|---|---|---|
| CN | 103900548 A | 7/2014 |
| CN | 104089612 A | 10/2014 |
| CN | 105122003 A | 12/2015 |
| CN | 105157726 A | 12/2015 |
| CN | 105466406 A | 4/2016 |
| EP | 1 253 399 B1 | 6/2006 |
| EP | 2 887 013 A1 | 6/2015 |
| WO | WO 2014/094996 A1 | 6/2014 |

7: Top monocrystalline silicon

8: Middle monocrystalline silicon

9: Bottom monocrystalline silicon

10: Signal input lines

11: Signal output lines

SILICON-BASED MICRO-MACHINED VIBRATORY GYROSCOPE WITH AN I-SHAPED STRUCTURE

TECHNICAL FIELD

This invention belongs to micro-electromechanical systems MEMS and micro inertial measurement technique, especially a silicon-based micro-machined vibratory gyroscope with an I-shaped structure.

BACKGROUND OF THE INVENTION

Silicon-based micro-machined gyroscope is an angular rate measurement inertial sensor, fabricated with micro-machined process, and can be integrated with its readout circuit on one silicon chip, having advantages on low volume, low-cost, light-weight and good reliability, showing great worth in both military and civilian applications.

Nowadays, the performance of silicon micro-machined gyros has progressed from ordinary car level to near tactical level 1deg/h, however, applications such as vibration and temperature have poor performance, especially vibration environment. Dual mass tuning fork gyroscope is a known structure having good vibration immunity, but due to the existence of many low-order vibration modes, fabrication errors and high-Q factor, it still has a large vibration error, which affects its practical application.

An-ping Qiu and Qin Shi proposed a dual mass vibrating gyroscope in 2007 200710133223.5, which comprises two proof masses connected with up and down crossbeams via support systems, and bounded with a pair of torsion levers to the pedestals. Experiment results indicate the proposed gyroscope has properties of low error, high sensitivity and good performance under static environment. However, this structure can only link with anchors via a middle torsion lever, resulting in poor structural stability; meanwhile, this gyroscope has several low-order modes near the operational modes, in a vibrating environment, these modal motions have a great influence on the gyroscope output. In addition, the stiffness of the torsion lever affects the frequency of the gyroscope detection mode, and the torsion lever is directly connected to the anchor point, its rigidity is affected by the fabrication stress and the package stress, thereby affecting the gyroscope output and deteriorating its temperature performance.

TRONICS MICROSYSYTEMS S.A. reported a micro-machined z-axis gyroscope in 2014 WO 2014/094996 A1, the z-axis micro-gyroscope adopts the same structure as the ZL 200710133223.5 gyroscope, which also formed by two proof masses, and connected with up and down crossbeams via support systems, and the crossbeams are bounded with coupled support beam to the fixed pedestals. In addition, this patent also lists several coupled support beam instances, including its structural style and arrangement method. However, the structural proposal of the patent application has the same technical problems as the ZL 200710133223.5 gyroscope.

SUMMARY OF THE INVENTION

The invention aims to provide a silicon micromachined gyroscope with small error, high mechanical sensitivity, low vibration sensitivity and low temperature sensitivity, which can realize the motion decoupling of the drive mode and detection mode, large amplitude vibration and detection output decoupling.

The technical solution of this invention is a silicon-based micro-machined vibratory gyroscope with an I-shaped structure which measures the angular rate perpendicular to a base, and comprises a top monocrystalline silicon, a middle monocrystalline silicon, and a bottom monocrystalline silicon; the top monocrystalline silicon being arranged with signal input and output lines is the silicon micro gyroscope packaged cover plate; the middle monocrystalline silicon is where the gyroscope mechanical structures are fabricated; the bottom monocrystalline silicon is a gyroscope substrate with fixed pedestals; the middle monocrystalline silicon layer is sealed in a closed cavity formed by top and bottom monocrystalline silicon layers; the middle monocrystalline silicon layer comprises sub-structures, I-shaped frame, torsion levers, multi-folded beams and isolation structure; the two substructures are arranged in an I-shaped frame symmetrically, by connecting the drive beams with an I-shaped frame; the I-shaped frame is connected with isolation structures through torsion levers and multi-folded beams distributed at the top and lower end of the I-shaped frame; the isolation structures are bonded with the fixed pedestals on the bottom monocrystalline silicon, so that the mechanical structures on middle monocrystalline silicon layer are suspended between the top single crystal silicon and the bottom single crystal silicon.

Compared with previous arts, this invention has the following notable improvements: (1) The silicon micromachined gyroscope structure is connected with the isolation structure through four multi-folded beams and the up, middle and down torsion levers, which increases the stability of the structure and improves the structural vibration immunity; (2) The silicon micromachined gyroscope structure is connected with the isolation structure through four multi-folded beams and the up, middle and down torsion levers, which increases its stiffness along z-axis and overcomes the stiffness limitation caused by the small thickness of MEMS fabrication process; (3) The two sub-structures are connected by an I-shaped frame to increase the stiffness in the x direction and the stiffness in the y direction of the gyroscope structure, effectively suppressing the influence of the in-phase force, such as vibration and shock; (4) The drive support beam and the detection support beam are connected to the I-shaped frame, and the I-shaped frame passes through the torsion lever and multiple-folded beams to the isolation structure, and the isolation structure is connected with the fixed pedestals. This connection way greatly reduces the influence of processing stress and package stress, and reduces the temperature error; (5) The two sub-structures are connected together by an I-shaped frame, and then the torsion levers and the multi-folded support beams are connected with the fixed pedestals to realize the movement of the tuning fork of the two sub-structures; (6) The drive motion and detection motion of the two sub-structures are opposite to each other, forming a differential comb capacitance detection, achieving detection output decoupling and suppressing interfering signals; (7) The two substructures are symmetrically arranged side by side, increasing the output signal twice as the output signal of a single mass; (8) Two sets of support beams are used to separate the drive part from the detection part, thus decoupling the movement of the drive direction and the detection direction, thereby reducing the error signal.

The following sections describe this invention with attached figures.

DETAILED DESCRIPTION OF THE INVENTION

Figure 6:
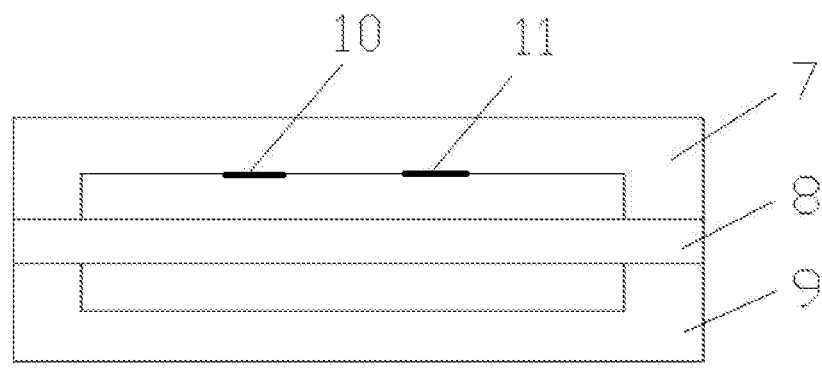
FIG. 6 is the schematic of a silicon-based micro-machined vibratory gyroscope according to one embodiment of the present invention.

This patent introduces a silicon-based micro-machined vibratory gyroscope with an I-shaped structure, which measures the angular rate perpendicular to a base, is characterized by a top monocrystalline silicon 7, a middle monocrystalline silicon 8, and a bottom monocrystalline silicon 9 as shown in FIG. 6. The top monocrystalline silicon 7 being arranged with signal input lines 10 and signal output lines H is the silicon micro gyroscope packaged cover plate. The middle monocrystalline silicon 8 is where the gyroscope mechanical structures are fabricated. The bottom monocrystalline silicon 9 is a gyroscope substrate with fixed pedestals. The middle monocrystalline silicon layer is sealed in a closed cavity formed by top and bottom monocrystalline silicon layers. The middle monocrystalline silicon layer comprises of sub-structures, I-shaped frame, torsion levers, multi-folded beams and isolation structure. The two sub-structures are arranged in an I-shaped frame symmetrically, by connecting the drive beam with an I-shaped frame, the I-shaped frame is connected with an isolation structure through a torsion levers and a multi-folded beam distributed at the top and lower end. The isolation structure is bonded with the fixed pedestal on the bottom monocrystalline silicon, so that the mechanical structures on middle monocrystalline silicon layer are suspended between the top single crystal silicon and the bottom single crystal silicon.

Figure 1:
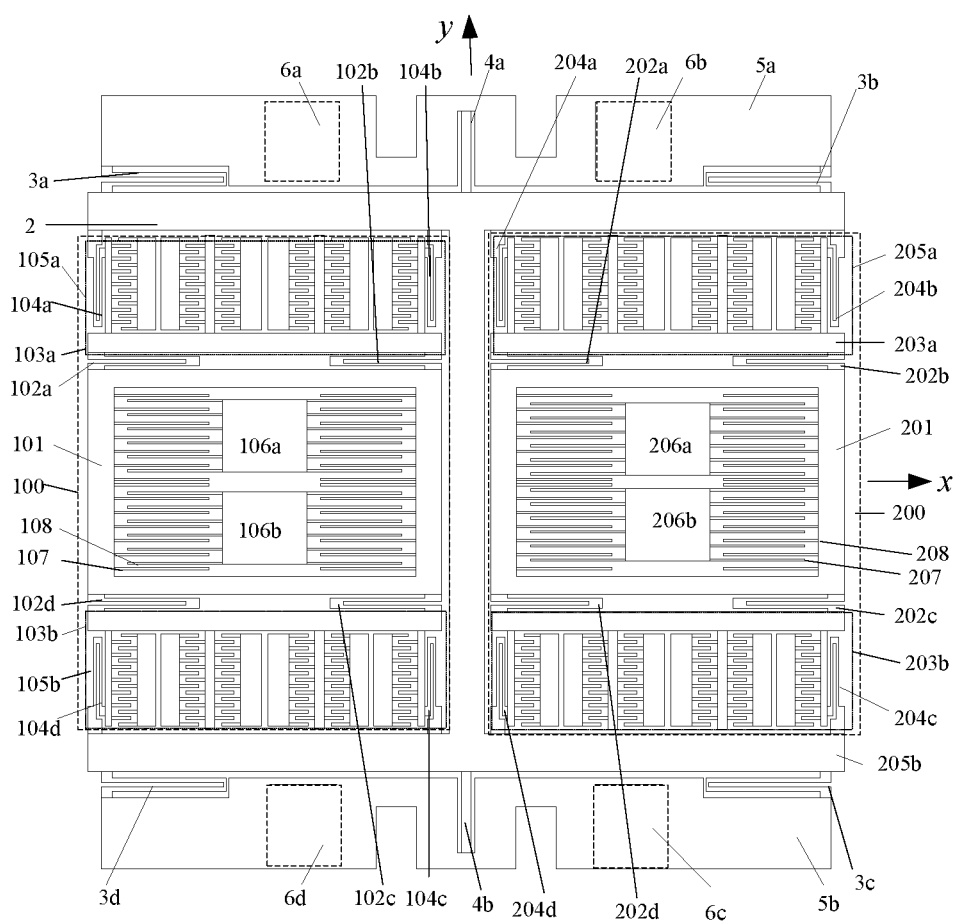
FIG. 1 is the schematic of silicon-based micro-machined vibratory gyroscope with an I-shaped structure.

According to FIG. 1, for the silicon-based micro-machined vibratory gyroscope with an I-shaped structure, the gyroscope mechanical structure on the middle monocrystalline silicon layer 8 consist of first sub-structure 100, second sub-structure 200, I-shaped frame 2, first multi-folded beam 3a, second multi-folded beam 3b, third multi-folded beam 3c, fourth multi-folded beam 3d, first torsion lever 4a, second torsion lever 4b, first isolation structure 5a and second isolation structure 5b. The first sub-structure 100 and second sub-structure 200 are identical in composition and structure, and disposed in an I-shaped frame 2 symmetrical to y axis y axis direction is from bottom to top, and x axis direction is from left to right. First sub-structure 100 is connected to the I-shaped frame 2 by first drive support beam 104a, second drive support beam 104b, third drive support beam 104c, and fourth drive support beam 104d. Second sub-structure 200 is connected to the I-shaped frame 2 by fifth driving support beam 204a, sixth driving support beam 204b, seventh driving support beam 204c, and eighth driving support beams 204d. The I-shaped frame 2 is connected to first isolation structure 5a above the I-shaped frame 2 by first multi-folded beam 3a, second multi-fold beam 3b and first torsion lever 4a. The I-shaped frame 2 is connected to the second isolation structure 5b below the I-shaped frame 2 by third multi-folded beam 3c, fourth multi-folded beam 3d and second torsion lever 4b. First isolation structure 5a is bonded to first fixing pedestal 6a and second fixing pedestal 6b on the bottom monocrystalline silicon, and second insulating structure 5b is bonded to the third fixing pedestal 6c and fourth fixed pedestal 6d on the bottom monocrystalline silicon.

The first sub-structure 100 of the I-shaped silicon micro-mechanical vibration gyroscope in this invention comprises first rectangular frame 101, first detection support beam 102a, second detection support beam 102b, third detection support beam 102c, fourth detection support beam 102d, first drive resonator 105a, second drive resonator 105b, first movable detection comb fingers 107, first fixed detection comb fingers 108, first detection comb fixed electrode 106a and second detection comb fixed electrode 106b. First movable detection comb fingers 107 which is arranged on first rectangular frame 101 constitute a detection comb capacitance with first fixed detection comb fingers 108 arranged on first and second detection comb fixed electrodes 106a, 106b, and the first and second detection comb fixed electrodes 106a, 106b are bonded to the fixed pedestal of the bottom monocrystalline silicon. The upper end of the first rectangular frame 101 is connected to first drive resonator 105a by first detection support beam 102a and second detection support beam 102b, and the lower end of first rectangular frame 101 is connected to second drive resonator 105b by third detection support beam 102c and fourth detection support beam 102d. First drive support beam 104a and second driving support beam 104b on first drive resonator 105a are connected to I-shaped frame 2, third driving beam 104c and fourth driving beam 104d on second driving resonator 105b are connected to I-shaped frame 2.

The second sub-structure 200 comprises second rectangular frame 201, fifth detection support beam 202a, sixth detection support beam 202b, seventh detection support beam 202c, eighth detection support beam 202d, third driving resonator 205a, fourth driving resonator 205b, second movable detection comb fingers 207, second fixed detection comb fingers 208, third detection comb fixed electrode 206a and fourth detection comb fixed electrode 206b. A second motion detection comb figures 207 disposed on second rectangular frame 201, and second fixed detection comb figures 208 disposed on the third and fourth detection comb fixed electrodes 206a, 206b constitute a comb-capacitor detection capacity. The forth comb fixed electrodes 206a, 206b are bonded to the corresponding fixed pedestals on the bottom monocrystalline silicon. The upper ends of second rectangular frames 201 are connected to third drive resonator 205a by fifth detection support beam 202a and sixth detection support beam 202b; the lower end of the second rectangular frame 201 is connected to fourth drive resonator 205b through seventh detection support beam 202c and eighth detection supporting beam 202d. Fifth driving support beam 204a and sixth driving support beam on the third driving resonator 205a are connected to the I-shaped frame 2, and seventh driving beam 204c and eighth driving beam 204d on fourth driving resonator 205b are connected to the I-shaped frame 2.

Figure 2:
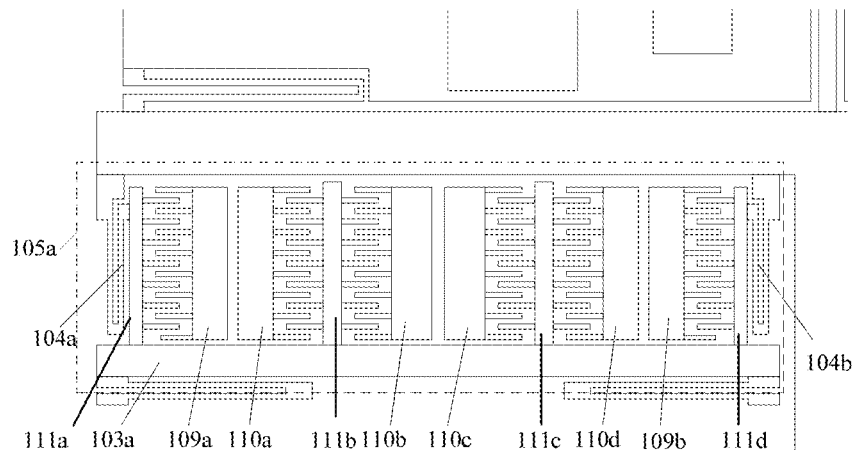
FIG. 2 is the schematic of drive resonator of silicon-based micro-machined gyroscope.

According to FIG. 1 and FIG. 2, for the silicon-based micro-machined vibratory gyroscope with an I-shaped structure, the first drive resonator 105a is identical in composition and structure with the second drive resonator 105b are exactly the same. First drive resonator 105a consists of first transverse bar 103a, first drive support beam 104a, second drive support beam 104b, first comb beam 111a, second comb beam 111b, third comb beam 111c, fourth comb beam 111d, first drive comb fixed electrode 110a, second drive comb fixed electrode 110b, third drive comb fixed electrode 110c, fourth drive comb fixed electrode 110d, first drive detection comb fixed electrode 109a and second drive detection comb fixed electrode 109b. First drive support beam 104a and second drive support beam 104b are located at both ends of first transverse bar 103a and are perpendicular to first transverse bar 103a. The first, second, third, and fourth comb beams 111a, 111b, 111c, 111d are vertically arranged on first transverse bar 103a and are sequentially arranged on first drive support beam 104a and second drive support beam 104b. Both sides of the second comb beam 111b and third comb beam 111c are provided with movable drive combs, constituting a drive capacitor with fixed drive combs on first drive comb fixed electrode 110a, second drive comb 110, third drive comb fixed electrode 110c, and fourth drive comb fixed electrode 110d. One side of first comb beam 111a and fourth comb beam 111d are provided with movable drive comb, constituting a drive sense capacitor with fixed drive combs on first drive detection comb fixed electrode 109a and second drive detection comb fixed electrode 109b. An AC voltage with DC bias is applied to first drive comb fixed electrode 110a and third drive comb fixed electrode 110c, and second drive comb fixed electrode 110b and fourth drive comb fixed electrode 110d are applied with an inverting AC voltage to create a bilateral drive; first drive detection comb fixed electrode 109a and second drive detection comb fixed electrode 109b are applied with a pair of reversed DC voltage to form a differential capacitance detection.

Figure 3:
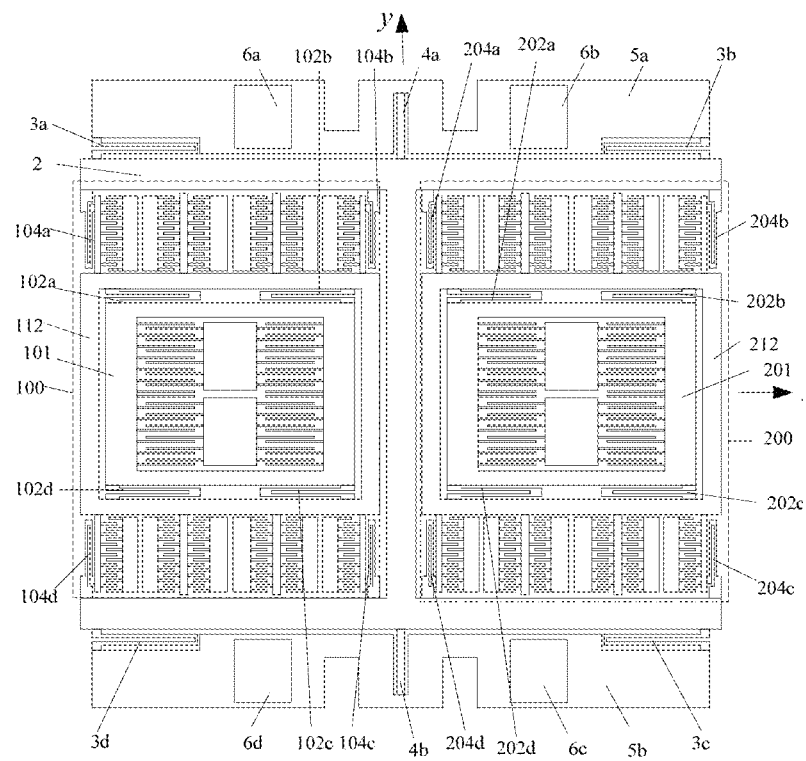
FIG. 3 is the schematic of another silicon-based micro-machined vibratory gyroscope with an I-shaped structure.

According to FIG. 1 and FIG. 3, first driving resonator 105a of the silicon-based micro-mechanical vibratory gyroscope with an I-shaped structure of the present invention has the same composition and structure as the second driving resonator 105b. First transverse bar 103a for first drive resonator 105a is located at the upper ends of first rectangular frame 101, and second transverse bar 103b of second drive resonator 105b is located at the lower ends of the first rectangular frame 101. First transverse bar 103a and the second transverse bar 103b are integrated to form the outer rectangular frame 112 of the first rectangular frame 101. Third transverse bar 203a for the drive resonator 205a is located at the upper ends of second rectangular frame 201, and fourth transverse bar 103b of fourth drive resonator 205b is located at the lower ends of second rectangular frame 201. Third transverse bar 203a and the forth transverse bar 203b are integrated to form the second outer rectangular frame 212 of the second rectangular frame 201. Compared with the structure in FIG. 1, the structure is exactly the same except that first rectangular frame 112 and second rectangular frame 212 in the driving resonator are integrated.

Figure 4:
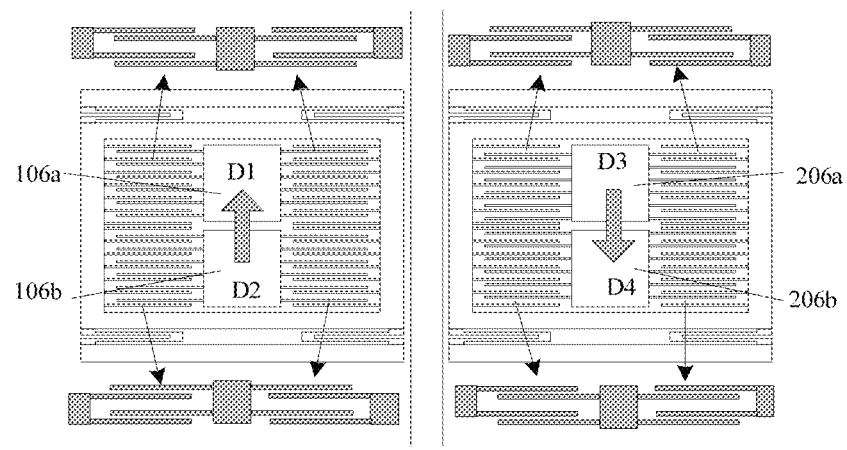
FIG. 4 is the schematic of comb structure for open-loop sensing scheme of silicon-based micro-machined gyroscope.

The silicon-based micro-machined vibratory gyroscope with an I-shaped structure of the present invention can adopt two schemes of open-loop and closed-loop. FIG. 4 is a schematic view of the detecting comb structure of the gyro open loop detection. The detection comb structure for open loop detection consists of first detection comb fixed electrode 106a, second detection comb fixed electrode 106b, third detection comb fixed electrode 206a, fourth detection comb fixed electrode 206b, first fixed detection comb fingers 108, second fixed detection comb fingers 208 and first moveable detection comb fingers 107, second moveable detection comb fingers 207. First, second, third, and fourth detection comb fixed electrodes 106a, 106b, 206a, 206b, first and second fixed detection comb fingers 108, 208 and first moveable detection comb fingers 107, second moveable detection comb fingers 207 constitute four pairs of sense comb capacitors. The fixed detection comb on first detection comb fixed electrode 106a and the corresponding moveable detection comb constitute first detection capacitance D1, and the fixed detection comb on second detection comb fixed electrode 106b and corresponding moveable detection comb constitute second detection capacitance D2, and the comb arrangement of first detection capacitance D1 and second detection capacitance D2 are anti-symmetric and constitute a differential detection topology to detect first rectangular frame 101 displacement in the y-axis direction. The fixed detection comb on third detection comb fixed electrode 206a and the corresponding moveable detection comb constitute third detection capacitance D3, and the fixed detection comb on fourth detection comb fixation electrode 206b and the corresponding moveable detection comb constitute fourth detection capacitance D4, and the arrangement of third detection capacitance D3 and fourth detection capacitance D4 is anti-symmetric, constituting a differential detection topology to detect second rectangular frame 201 displacement in the y-axis direction. The arrangement of the comb of first detection capacitor D1 and third detection capacitor D3 is anti-symmetric, and the arrangement of second detection capacitor D2 and fourth detection capacitor D4 is antisymmetric. First detection capacitor D1 is added to third detection capacitor D3 and second detection capacitance D2 is added to fourth detection capacitance D4, the influence of the same-direction movement on the output is suppressed.

Figure 5:
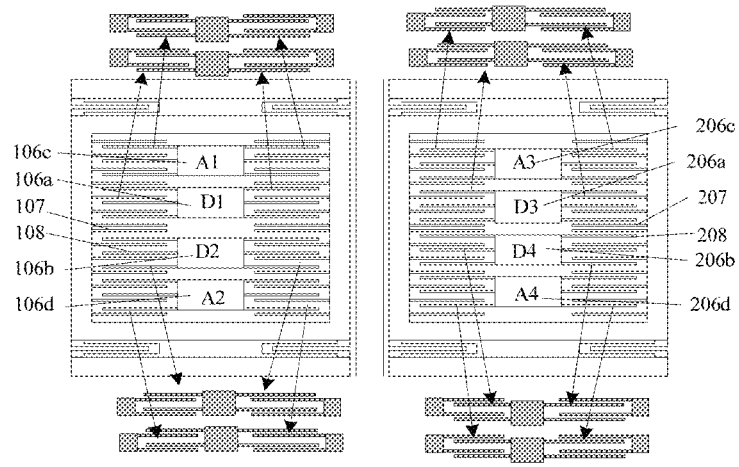
FIG. 5 is the schematic of comb structure for closed-loop sensing scheme of silicon-based micro-machined gyroscope.

The detection comb structure of the closed-loop detection is shown in FIG. 5. the detection comb structure of the gyroscope for closed loop detection consist of first detection comb fixed electrode 106a, second detection comb fixed electrode 106b, third detection comb fixed electrode 206a, fourth detection comb fixed electrode 206b, first force comb fixed electrode 106c, second force comb fixed electrode 106d, third force comb fixed electrode 206c, fourth force comb fixed electrode 206d, first fixed detection comb fingers 108, second fixed detection comb fingers 208, first moveable detection comb fingers 107, and second moveable detection comb fingers 207. First fixed detection comb fingers 108 is also provided on first force comb fixed electrode 106c and second force comb fixed electrode 106d, and the third force comb fixed electrode 206c, the second fixed detection comb fingers 208 is also arranged on the fourth force comb fixed electrode 206d. The first and second moveable detection comb fingers 107, 207 and the first and second fixed detection comb fingers 108, 208 on the first, second, third, and fourth detection comb fixed electrodes 106a, 106b, 206a, 206b and the first, second, third, and fourth force comb fixed electrodes 106c, 106d, 206c, 206d constitute four pairs of force comb capacitors. The fixed detection comb on first detection comb fixed electrode 106a and the corresponding moveable detection comb constitute the first detection capacitance D1, and the fixed detection comb on the second detection comb fixed electrode 106b and the corresponding movable detection comb constitute the second detection capacitor D2. The comb arrangement of the first detection capacitance D1 and second detection capacitance D2 are anti-symmetric and constitute a differential detection topology to detect first rectangular frame 101 displacement in the y-axis direction. The fixed detection comb on third detection comb fixed electrode 206a and the corresponding moveable detection comb constitute third detection capacitor D3, and the fixed detection comb on fourth detection comb fixed electrode 206b and the corresponding movable detection comb constitute fourth detection capacitor D4, and the comb arrangement of third detection capacitance D3 and fourth detection capacitance D4 are anti-symmetric and constitute a differential detection topology to detect second rectangular frame 201 displacement in the y-axis direction. The fixed detection comb on first force comb fixed electrode 106c and the corresponding movable detection comb constitute first force capacitor A1, and the fixed detection comb on the second force comb fixed electrode 106d, and the corresponding moveable detection comb constitute second force capacitor A2, and the fixed detection comb on third force comb fixed electrode 206c and the corresponding moveable detection comb constitute third force capacitor A3, and fourth force fixed detection comb on the comb fixed electrode 206d and the corresponding movable detection comb constitute fourth force capacitor A4. A voltage is applied to the first, second, third, and fourth force comb electrodes 106c, 106d, 206c, 206d to generate an electrostatic force; detection capacitances D1-D4 and force capacitors A1~A4 form a closed-loop detection, controlling the first and second rectangular frames 101, 201 in a balanced position.

The drive force can be generated by applying a pair of differential AC drive voltages with a DC bias via input route on top monocrystalline silicon layer on first fixed drive electrode 110a, third fixed drive electrode 110c and second fixed drive electrode 110b, fourth fixed drive electrode 110d of first sub-structure 100. It can be expressed as $$F_d = 4n\varepsilon \frac{h}{d} U_a U_d \sin\omega_d t \quad (1)$$

in which, n represents the number of movable drive comb fingers, ε is the dielectric constant, h and d stand for the thickness and gap of combs, $U_d$ and $U_a$ represent the DC and AC component of drive voltage, and $\omega_d$ is its frequency.

Similarly, drive force can be generated by applying in-phase drive voltage on second sub-structure 200. Since the comb fingers arrangement of first and second sub-structures 100, 200 is antisymmetric, the generated drive forces are out-of-phase.

Consequently, the moveable structures of first and second sub-structures 100, 200 play simple harmonic motion along drive axis under the drive force. The displacement can be expressed as 2 when the drive force frequency equals to the resonant frequency of drive mode.

$$x = \frac{F_{d0} Q_x}{k_x} \cos\omega_d t \quad (2)$$

in which, $F_{d0}$ represents the amplitude of drive force, $k_x$ is the stiffness along X-axis, $Q_x$ is the quality factor of drive mode. It corresponding velocity is $$V = \frac{dx}{dt} = \frac{F_{d0} Q_x}{k_x} \omega_d \sin\omega_d t \quad (3)$$

When a Z-axis angular rate $\omega_z$ applied on the gyroscope, the Coriolis acceleration along Y-axis can be derived as $$a_c = 2\omega_z V \sin\varphi = 2\omega_z \omega_d \frac{F_{d0} Q_x}{k_x} \sin\varphi \sin\omega_d t \quad (4)$$

in which φ represents the angle between input angular rate and oscillation velocity.

Suppose the drive mass is $m_a$, the Coriolis force applied on the sense proof mass is $$F_c = -m_a a_c = -2m_a \omega_z V \sin\varphi \quad (5)$$

The directions of Coriolis inertial force and Coriolis acceleration are out-of-phase, therefore, the Coriolis forces on first rectangular frame 101 and second rectangular frame 201 are out-of-phase. The first rectangular frames 101a nd second rectangular frames 201 play simple harmonic motion along sense Y axis with the Coriolis forces. In this way, the gap variation between moveable and fixed sense comb fingers follows the same trend of the first rectangular frames 101 and second rectangular frame 201. The capacitances difference can be readout by interface circuit via output route on top monocrystalline silicon layer and converts it to voltage. The total output voltage is a sum of readout voltages of first sub-structures 100 and second sub-structures 200 and proportional to the input angular rate. The input angular rate direction can be determined by comparing the phase between phase detector's input and output voltage.

The invention claimed is:

1. A silicon-based micro-machined vibratory gyroscope with an I-shaped structure comprising:
   a top monocrystalline silicon layer;
   a middle monocrystalline silicon layer; and
   a bottom monocrystalline silicon layer,
   wherein:
   the top monocrystalline silicon layer is arranged with signal input and output lines and is a cover plate,
   the middle monocrystalline silicon layer is where gyroscope mechanical structures are fabricated,
   the bottom monocrystalline silicon layer is a gyroscope substrate with fixed pedestals,
   the middle monocrystalline silicon layer is sealed in a closed cavity formed by the top monocrystalline silicon layer and the bottom monocrystalline silicon layer,
   the middle monocrystalline silicon layer comprises two sub-structures, an I-shaped frame, torsion levers, multi-folded beams and isolation structures,
   the two sub-structures are arranged symmetrically with respect to the I-shaped frame, by connecting drive beams of the two sub-structures with the I-shaped frame,
   the I-shaped frame is connected with the isolation structures through the torsion levers and the multi-folded beams distributed at a top end and a lower end of the I-shaped frame, and
   the isolation structures are bonded with the fixed pedestals on the bottom monocrystalline silicon layer, so that a gyroscope mechanical structure on the middle monocrystalline silicon layer is suspended between the top monocrystalline silicon layer and the bottom monocrystalline silicon layer.

2. The silicon-based micro-machined vibratory gyroscope with an I-shaped structure of claim 1, wherein:
   the gyroscope mechanical structure on the middle monocrystalline silicon layer comprises:
   the two sub-structures including a first sub-structure and a second sub-structure;
   the I-shaped frame;
   the multi-folded beams including a first multi-folded beam, a second multi-folded beam, a third multi-folded beam, and a fourth multi-folded beam;
   the torsion levers including a first torsion levers, and a second torsion lever; and the isolation structures including a first isolation structure and a second isolation structure, the first sub-structure and the second sub-structure are identical in composition and structure, and symmetrical disposed in the I-shaped frame, the first sub-structure is connected to the I-shaped frame by a first drive support beam, a second drive support beam, a third drive support beam, and a fourth drive support beam, the second sub-structure is connected to the I-shaped frame by a fifth driving support beam, a sixth driving support beam, a seventh driving support beam and an eighth driving support beams, the I-shaped frame is connected to the first isolation structure above the I-shaped frame by the first multi-folded beam, the second multi-fold beam and the first torsion lever, the I-shaped frame is connected to the second isolation structure below the I-shaped frame by the third multi-folded beam, the fourth multi-folded beam and the second torsion lever, and the first isolation structure is bonded to the first fixing pedestal and the second fixing pedestal on the bottom monocrystalline silicon, and the second insulating structure is bonded to the third fixing pedestal and the fourth fixed pedestal on the bottom monocrystalline silicon.

3. The silicon-based micro-machined vibratory gyroscope with an I-shaped structure of claim 2, wherein:

the first sub-structure comprises a first rectangular frame, a first detection support beam, a second detection support beam, a third detection support beam, a fourth detection support beam, a first drive resonator, a second drive resonator, first movable detection comb fingers, first fixed detection comb fingers, a first detection comb fixed electrode, and a second detection comb fixed electrode, the first movable detection comb fingers which are arranged on the first rectangular frame constitute a detection comb capacitance with the first fixed detection comb fingers arranged on the first and second detection comb fixed electrodes, and the first and second detection comb fixed electrodes are bonded to the fixed pedestal of the bottom monocrystalline silicon, an upper end of the first rectangular frame is connected to the first drive resonator by the first detection support beam and the second detection support beam, and a lower end of the first rectangular frame is connected to the second drive resonator by the third detection support beam and the fourth detection support beam, the first drive support beam and the second driving support beam on the first drive resonator are connected to the I-shaped frame, the third driving beam and the fourth driving beam on the second driving resonator are connected to the I-shaped frame, and the second sub-structure is identical in composition and structure to the first sub-structure, and comprises a second rectangular frame, a fifth detection support beam, a sixth detection support beam, a seventh detection support beam, an eighth detection support beam, a third driving resonator, a fourth driving resonator, second movable detection comb fingers, second fixed detection comb fingers, a third detection comb fixed electrode, and a fourth detection comb fixed electrode.

4. The silicon-based micro-machined vibratory gyroscope with an I-shaped structure of claim 3, wherein:

the first drive resonator is identical in composition and structure with the second drive resonator, the first drive resonator comprises a first transverse bar, the first drive support beam, the second drive support beam, a first comb beam, a second comb beam, a third comb beam, a fourth comb beam, a first drive comb fixed electrode, a second drive comb fixed electrode, a third drive comb fixed electrode, a fourth drive comb fixed electrode, a first drive detection comb fixed electrode and a second drive detection comb fixed electrode, the first drive support beam and the second drive support beam are located at both ends of the first transverse bar and are perpendicular to the first transverse bar, the first, second, third, and fourth comb beams are vertically arranged on the first transverse bar and are sequentially arranged on the first drive support beam and the second drive support beam, both sides of the second comb beam and the third comb beam are provided with movable drive combs, constituting a drive capacitor with fixed drive combs on the first drive comb fixed electrode, the second drive comb, the third drive comb fixed electrode, and the fourth drive comb fixed electrode, one side of the first comb beam and the fourth comb beam are provided with a movable drive comb, constituting a drive sense capacitor with fixed drive combs on the first drive detection comb fixed electrode and the second drive detection comb fixed electrode, an AC voltage with DC bias is applied to the first drive comb fixed electrode and the third drive comb fixed electrode, and the second drive comb fixed electrode and the fourth drive comb fixed electrode are applied with an inverting AC voltage to create a bilateral drive, and the first drive detection comb fixed electrode and the second drive detection comb fixed electrode are applied with a pair of reversed DC voltage to form a differential capacitance detection.

5. The silicon-based micro-machined vibratory gyroscope with an I-shaped structure of claim 4, wherein:

a detection comb structure of the gyroscope for a closed loop detection comprises the first detection comb fixed electrode, the second detection comb fixed electrode, the third detection comb fixed electrode, the fourth detection comb fixed electrode, a first force comb fixed electrode, a second force comb fixed electrode, a third force comb fixed electrode, a fourth force comb fixed electrode the first fixed detection comb fingers, the second fixed detection comb fingers, the first moveable detection comb fingers, and the second moveable detection comb fingers, the first fixed detection comb fingers is also provided on the first force comb fixed electrode and the second force comb fixed electrode, and the third force comb fixed electrode, the second fixed detection comb fingers is also arranged on the fourth force comb fixed electrode, the first and second moveable detection comb fingers and the first and second fixed detection comb fingers on the first, second, third, and fourth detection comb fixed electrodes and the first, second, third, and fourth force comb fixed electrodes constitute four pairs of force comb capacitors, the fixed detection comb on the first detection comb fixed electrode and the corresponding moveable detection comb constitute a first detection capacitance D1, and the fixed detection comb on the second detection comb fixed electrode and the corresponding movable detection comb constitute a second detection capacitor D2, comb arrangements of the first detection capacitance D1 and the second detection capacitance D2 are anti-symmetric and constitute a differential detection topology to detect a first rectangular frame displacement in a y-axis direction, the fixed detection comb on third detection comb fixed electrode and the corresponding moveable detection comb constitute a third detection capacitor D3, and the fixed detection comb on fourth detection comb fixed electrode and the corresponding movable detection comb constitute a fourth detection capacitor D4, comb arrangements of the third detection capacitance D3 and the fourth detection capacitance D4 are anti-symmetric and constitute a differential detection topology to detect a second rectangular frame displacement in the y-axis direction, the fixed detection comb on the first force comb fixed electrode and the corresponding movable detection comb constitute a first force capacitor A1, and the fixed detection comb on the second force comb fixed electrode, and the corresponding moveable detection comb constitute a second force capacitor A2, the fixed detection comb on the third force comb fixed electrode and the corresponding moveable detection comb constitute a third force capacitor A3, and the fourth force fixed detection comb on the comb fixed electrode and the corresponding movable detection comb constitute a fourth force capacitor A4, a voltage is applied to the first, second, third, and fourth force comb electrodes to generate an electrostatic force, and the detection capacitances D1~D4 and the force capacitors A1~A4 form a closed-loop detection, controlling the first and second rectangular frames in a balanced position.

6. The silicon-based micro-machined vibratory gyroscope with an I-shaped structure of claim 4, wherein:

a detection comb structure for an open loop detection comprises the first detection comb fixed electrode, the second detection comb fixed electrode, the third detection comb fixed electrode, the fourth detection comb fixed electrode, the first fixed detection comb fingers, the second fixed detection comb fingers, the first moveable detection comb fingers, and the second moveable detection comb fingers, the first, second, third, and fourth detection comb fixed electrodes, the first and second fixed detection comb fingers, the first moveable detection comb fingers, and the second moveable detection comb fingers constitute four pairs of sense comb capacitors, the fixed detection comb on the first detection comb fixed electrode and the corresponding moveable detection comb constitute a first detection capacitance D1, the fixed detection comb on the second detection comb fixed electrode and the corresponding moveable detection comb constitute a second detection capacitance D2, and comb arrangements of the first detection capacitance D1 and the second detection capacitance D2 are anti-symmetric and constitute a differential detection topology to detect a first rectangular frame displacement in a y-axis direction, the fixed detection comb on the third detection comb fixed electrode and the corresponding moveable detection comb constitute a third detection capacitance D3, the fixed detection comb on the fourth detection comb fixation electrode and the corresponding moveable detection comb constitute a fourth detection capacitance D4, and arrangements of the third detection capacitance D3 and the fourth detection capacitance D4 is anti-symmetric, constituting a differential detection topology to detect a second rectangular frame displacement in the y-axis direction, the arrangement of the comb of the first detection capacitor D1 and the third detection capacitor D3 is anti-symmetric, and the arrangement of the second detection capacitor D2 and the fourth detection capacitor D4 is antisymmetric, and the first detection capacitor D1 is added to the third detection capacitor D3, the second detection capacitance D2 is added to the fourth detection capacitance D4, and an influence of a same-direction movement on an output is suppressed.

7. The silicon-based micro-machined vibratory gyroscope with an I-shaped structure of claim 3, wherein:

the first transverse bar for the drive resonator is located at upper ends of the first rectangular frame, the second transverse bar of the second drive resonator is located at lower ends of the first rectangular frame, and the first transverse bar and the second transverse bar are integrated to form an outer rectangular frame of the first rectangular frame.

8. The silicon-based micro-machined vibratory gyroscope with an I-shaped structure of claim 3, wherein:

a detection comb structure for an open loop detection comprises the first detection comb fixed electrode, the second detection comb fixed electrode, the third detection comb fixed electrode, the fourth detection comb fixed electrode, the first fixed detection comb fingers, the second fixed detection comb fingers, the first moveable detection comb fingers, and the second moveable detection comb fingers, the first, second, third, and fourth detection comb fixed electrodes, the first and second fixed detection comb fingers, the first moveable detection comb fingers, and the second moveable detection comb fingers constitute four pairs of sense comb capacitors, the fixed detection comb on the first detection comb fixed electrode and the corresponding moveable detection comb constitute a first detection capacitance D1, the fixed detection comb on the second detection comb fixed electrode and the corresponding moveable detection comb constitute a second detection capacitance D2, and comb arrangements of the first detection capacitance D1 and the second detection capacitance D2 are anti-symmetric and constitute a differential detection topology to detect a first rectangular frame displacement in a y-axis direction, the fixed detection comb on the third detection comb fixed electrode (206a) and the corresponding moveable detection comb constitute a third detection capacitance D3, the fixed detection comb on the fourth detection comb fixation electrode (206b) and the corresponding moveable detection comb constitute a fourth detection capacitance D4, and arrangements of the third detection capacitance D3 and the fourth detection capacitance D4 is anti-symmetric, constituting a differential detection topology to detect a second rectangular frame displacement in the y-axis direction, the arrangement of the comb of the first detection capacitor D1 and the third detection capacitor D3 is antisymmetric, and the arrangement of the second detection capacitor D2 and the fourth detection capacitor D4 is antisymmetric, and the first detection capacitor D1 is added to the third detection capacitor D3, the second detection capacitance D2 is added to the fourth detection capacitance D4, and an influence of a same-direction movement on an output is suppressed.

* * * * *